W. BROADWAY AND T. C. PLEDGER.
RIM FASTENER.
APPLICATION FILED APR. 11, 1921.
1,424,078.
Patented July 25, 1922.
2 SHEETS—SHEET 1.
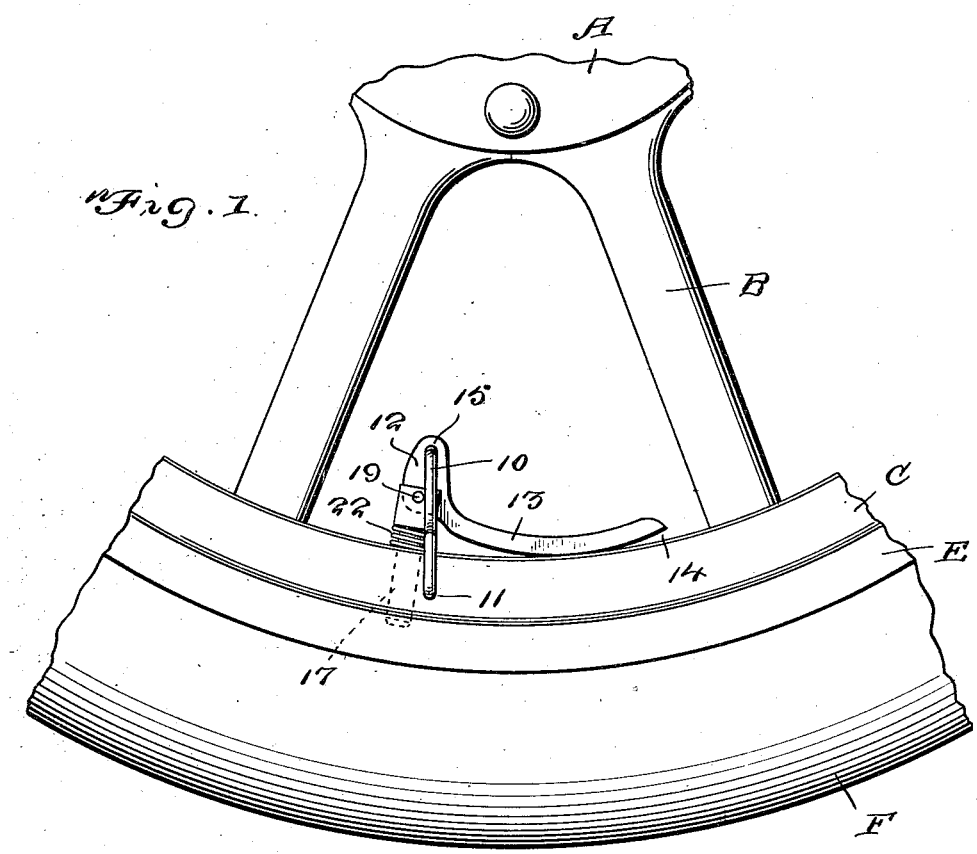
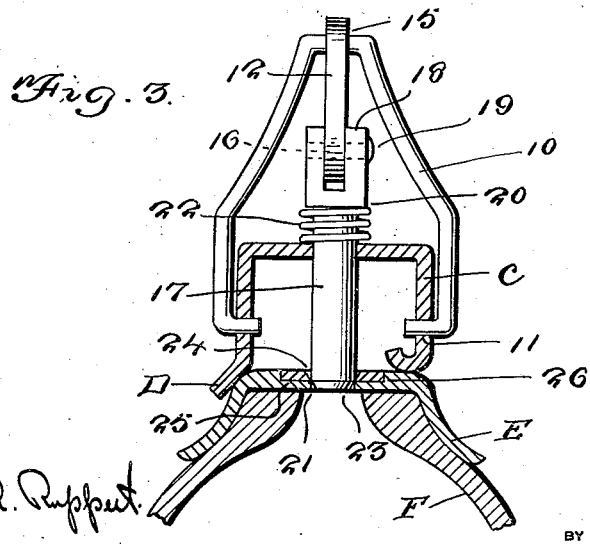
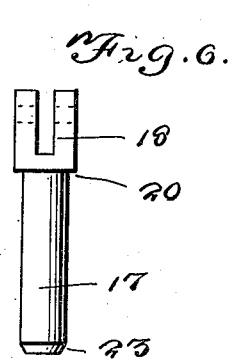
William Broadway
Thomas C. Pledger
INVENTOR
BY Victor J. Evans
ATTORNEY W. BROADWAY AND T. C. PLEDGER.
RIM FASTENER.
APPLICATION FILED APR. 11, 1921.
1,424,078.
Patented July 25, 1922.
2 SHEETS—SHEET 2.
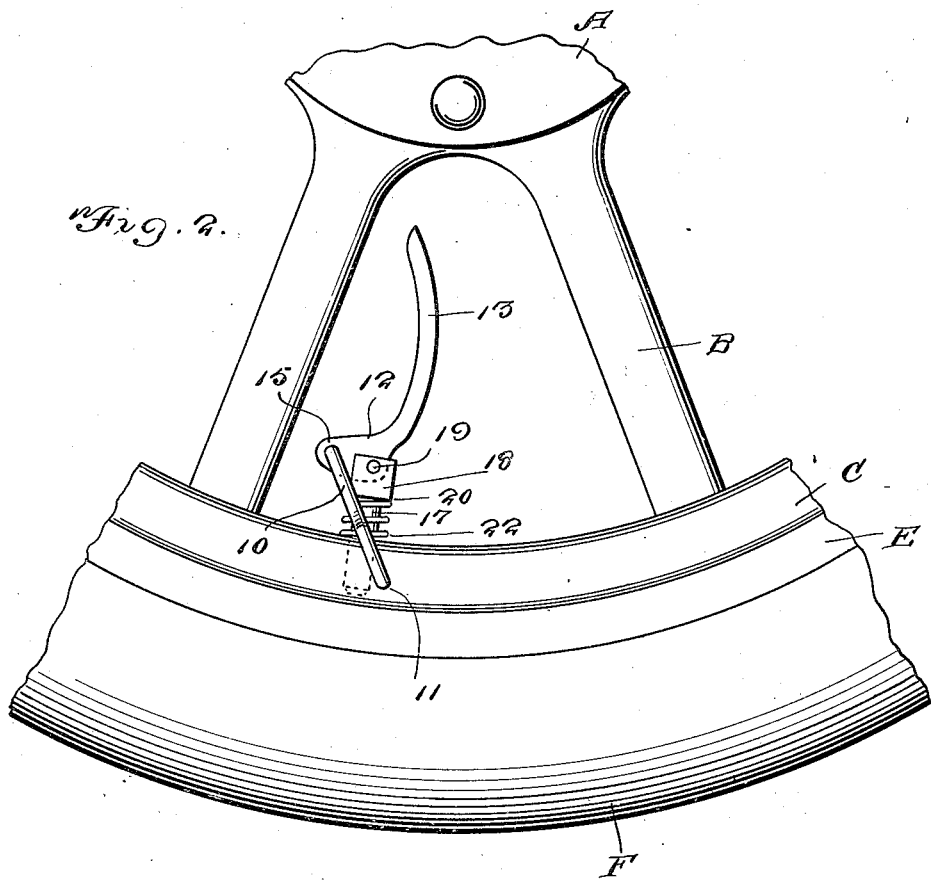
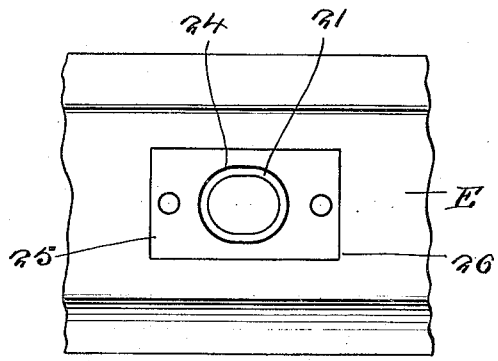
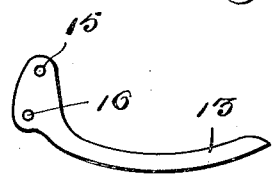
William Broadway
Thomas C. Pledger
INVENTOR
BY Victor J. Evans
ATTORNEY
WITNESS:

UNITED STATES PATENT OFFICE.

WILLIAM BROADWAY AND THOMAS C. PLEDGER, OF OKLAHOMA, OKLAHOMA; SAID BROADWAY ASSIGNOR TO SAID PLEDGER.

RIM FASTENER.

1,424,078. Specification of Letters Patent. Patented July 25, 1922.

Application filed April 11, 1921. Serial No. 460,215.

*To all whom it may concern:*

Be it known that we, WILLIAM BROADWAY and THOMAS C. PLEDGER, citizens of the United States, residing at Oklahoma city, in the county of Oklahoma and State of Oklahoma, have invented new and useful Improvements in Rim Fasteners, of which the following is a specification.

This invention relates to demountable rim wheels, particularly to devices for securing demountable rims upon wheels, and has for its object the provision of a novel lever actuated device for securing a demountable rim in proper position upon the felly of a wheel without any necessity for the employment of nuts, bolts or other similar securing devices, this locking means operating entirely on a cam principle.

An important object is the provision of a locking device of this character which is so constructed that even when it is in unlocked position the parts remain permanently associated with the felly of the wheel so that they cannot become displaced and lost.

An additional object is the provision of a device of this character which will be simple and inexpensive in manufacture, highly efficient in use, rapid in action, durable in service and a general improvement in the art.

With the above and other objects and advantages in view, the invention consists in the details of construction to be hereinafter more fully described and claimed, and illustrated in the accompanying drawings in which:—

Figure 1 is a side elevation of a wheel constructed in accordance with our invention.

Figure 2 is a longitudinal sectional view on a larger scale showing one of the locking members in locked position.

Figure 3 is a similar view showing the parts in unlocked position.

Figure 4 is a cross sectional view through the complete locking device.

Fig. 5 is a perspective view of the locking lever, and

Fig. 6 is a perspective view of the locking pin.

Referring more particularly to the drawings we have shown a wheel including a hub portion A, spokes B, and a channel shaped felly C, in the present instance being shown as formed of sheet metal, this felly being carried by the outer ends of the spokes and having one edge deflected laterally as indicated at B to provide an abutment for the demountable rim E which carries the tire F.

In carrying out our invention we provide a plurality of locking members secured at suitably spaced intervals upon and permanently associated with the felly C and arranged between the spokes as clearly shown. Each locking device comprises a yoke 10 of substantially V-shape with the ends of its arms inwardly deflected and pivotally engaged within holes 11 formed in the opposite sides of the felly. Pivoted upon the bight portion of the yoke 10 is a cam lever including a head portion 12 and an elongated curved handle portion 13. This handle portion 13 is engaged against the inner periphery of the felly when the locking device is in its locked position but the curvature is such that the extremity of the handle member is spaced always slightly from the internal periphery of the felly as indicated at 14. The head portion 12 of the cam member is formed with spaced holes 15 and 16, the former of which provides the pivotal connection of the cam member with the yoke 10.

Associated with the cam member is a plunger 17 which has its upper end forked as shown at 18 for the accommodation of the lower portion of the cam head 12 and the cam head is pivotally connected with the plunger by means of a pin or bolt 19 which passes through the hole 16 and through the forked head of the plunger. This forked head of the plunger is enlarged as shown to define a shoulder 20 and the smaller portion of the plunger is slidable through a hole 21 in the inner periphery of the felly C. A coil spring 22 surrounds the plunger and abuts against the shoulder 20 and against the inner periphery of the felly for normally urging the plunger inwardly towards the center of the wheel or into its unlocking position. The outer extremity of the plunger is preferably somewhat tapered as indicated at 23 for engagement within a slightly tapered hole 24 formed in a metal plate 25 secured within a shallow recess 26 in the inner periphery of the demountable rim E.

In the use of the device it will be seen that the rim is disposed upon the felly in the usual manner it being necessary however that the rim be adjusted circumferentially with respect to the felly so as to bring the holes 24 in the plates 25 in registration with the plungers 17. The cam members are then swung outwardly until the handle portions 13 thereof engage against the inner periphery of the felly whereupon it will be seen that the plungers 17 will be moved outwardly until the tapered outer ends 23 engage within the holes 24 and the plates 25. The rim will thus be locked securely with respect to the felly so that any accidental displacement will be prevented.

When it is desired to remove the demountable rim, it is merely necessary that the operator insert a flat implement such as a screw driver or a tire iron beneath the free ends of the handle members 13 within the spaces 14 shown and pry the handle members 13 toward the center of the wheel which will naturally result in retraction of the plunger 17 from the hole 24 so that the rim will be released. It will be observed that the springs 22 in the locking devices will hold the parts in this unlocked position until the cam members are locked whereupon the holes 15 and 16 going past center will operate to hold the locking position.

From the foregoing description and a study of the drawings it will be apparent that we have thus provided a very simple and efficient means for locking a demountable rim upon a wheel which will be very rapid in action and which is almost incapable of becoming deranged owing to the simplicity of the construction and operation.

While we have shown and described the preferred embodiment of the invention, it is of course to be readily apparent that we reserve the right to make such changes in the form, construction and arrangement of parts as will not depart from the spirit of the invention or the scope of the subjoined claims.

Having thus described the invention, we claim:

1. In a wheel including a felly and a demountable rim disposed thereon, means for locking the rim upon the felly comprising a series of locking devices disposed throughout the inner periphery of the felly and each comprising a spring pressed plunger slidable through the felly, a socket member carried by the inner periphery of the rim at each locking member and adapted to receive the plunger, and cam means for forcing said plunger outwardly into engagement with the socket.

2. Means for locking a demountable rim upon the felly of a wheel, comprising a series of locking devices arranged in spaced relation throughout the periphery of the felly, each locking device including a plunger slidable through the felly and having its inner end enlarged and forked, a spring surrounding the plunger and abutting against the inner periphery of the felly and the shoulder defined by said enlarged portion whereby to normally urge the plunger towards the center of the wheel, socket members carried by the inner periphery of the rim into which said plungers are adapted to be forced, a yoke pivotally connected with the felly and straddling the plunger, and a lever having a cam head pivoted upon the yoke and pivotally connected with the inner end of the plunger.

WILLIAM BROADWAY.
THOMAS C. PLEDGER.